United States Patent [19]

Herr et al.

[11] Patent Number: 5,070,946
[45] Date of Patent: Dec. 10, 1991

[54] STONE BURYING ATTACHMENT FOR LANDSCAPE MACHINES

[75] Inventors: John L. Herr, Lititz; John W. Herr, New Holland, both of Pa.

[73] Assignee: ATI Corporation, New Holland, Pa.

[21] Appl. No.: 663,116

[22] Filed: Mar. 1, 1991

[51] Int. Cl.$^5$ .................... A01B 43/00; A01B 9/00; A01B 33/16

[52] U.S. Cl. ...................... 171/65; 172/68; 172/124; 172/602

[58] Field of Search .............. 172/68, 31, 35, 63, 172/64, 69, 70, 38, 683, 122, 123, 124, 554, 602, 744, 536, 519; 171/65, 19

[56] References Cited

U.S. PATENT DOCUMENTS

| | | | |
|---|---|---|---|
| 4,315,546 | 2/1982 | Fahrenholz | 171/65 |
| 4,440,235 | 4/1984 | Colistro | 171/65 |
| 4,496,003 | 1/1985 | Bynum | 171/65 |
| 4,759,411 | 7/1988 | Williamson | 172/602 |
| 4,838,359 | 6/1989 | Kirch | 172/124 |

FOREIGN PATENT DOCUMENTS 1155170  5/1985  U.S.S.R. ................... 171/65

OTHER PUBLICATIONS

Ag-Tech Industries, Pre-Seeder, 12-1986.
Ag-Tech Industries, Pre-Seeder, 1-1987.

Primary Examiner—Dennis L. Taylor
Assistant Examiner—Spencer Warnick

[57] ABSTRACT

A stone burying attachment for a finish grading landscape machine is disclosed wherein the attachment is optionally mounted to the frame of the machine to create a furrow immediately forwardly of the discharge side of the machine to permit a burying a stones and other unwanted debris collected by the landscape machine during operation thereof. The stone burying attachment is positionally adjustable between operative and inoperative positions to permit a selective engagement thereof at the discretion of the operator. The attachment includes a disc positioned angularly with respect to the direction of travel and also positionable at varying heights in the operative position for selectively varying the desired depth of the furrow being formed thereby. A breakaway feature protects the attachment if the disc engages an immovable object.

20 Claims, 5 Drawing Sheets

“5,070,946”

STONE BURYING ATTACHMENT FOR LANDSCAPE MACHINES

BACKGROUND OF THE INVENTION

The present invention relates generally to landscape machines used to prepare the surface of the ground for seeding lawns, etc., and, more particularly, to an attachment for such landscape machines to effect the burying of stones gathered during the operation of the landscape machine.

Fine grading landscape machines, such as the Model 600 Preseeder TM seedbed preparation machine sold by ATI Corporation, are used to finish a rough graded plot of ground to prepare the soil for application of seeding materials thereon. These landscape machines perform the functions of tilling the ground, while leveling the ground to a uniform finish. This machine also rakes stones, debris and excess soil to one side, depositing this extraneous material in a windrow along the discharge side of the machine.

In instances where the ground being prepared has an abundance of stones or the area being prepared is sufficiently expansive, the windrow of stones and debris can become rather sizeable, causing problems with disposition of the unwanted material. Furthermore, an overabundance of collected stones and debris can result in an inefficiency in the operation of the machine to the point where the machine cannot continue to effect a discharge of the unwanted stones and debris to the side. In such instances, it is necessary to collect this material from the ground for remote disposal before proper operation of the machine can continue.

Accordingly, it would be desirable to provide a mechanism that would be operable to dispose of the collected stones and debris by burying them beneath the surface of the ground during operation of the machine in such a manner that the finished surface of the seedbed is undisturbed after a subsequent passage of the landscape machine.

SUMMARY OF THE INVENTION

It is an object of this invention to overcome the disadvantages of the prior art landscape fine grading machine by providing an attachment thereto that is operable to dispose of the collected stones and unwanted debris during operation of the machine.

It is another object of this invention to provide a landscape machine with an attachment that is effective in burying stones and unwanted debris beneath the surface of the ground during the normal operation of the landscape machine in preparing the ground for application of seeding materials.

It is a feature of this invention that the stone burying attachment can be added to the basic landscape machine as an optional attachment without requiring a reworking of the basic machine.

It is an advantage of this machine that the normal operation of the basic landscape machine is unaffected by the connection thereto of a stone burying attachment.

It is another feature of this invention that the stone burying attachment creates a furrow in the surface of the ground immediately forwardly of the discharge side of the landscape machine so that the stones and debris windrowed by the machine along the discharge edge fall into the depressed furrow to be covered by the continued operation of the machine.

It is another advantage of this invention that the windrowed stones and debris are buried beneath the surface of the ground by the normal operation of the landscape machine.

It is still another advantage of this machine that the collection of stones and other unwanted debris need not accumulate from pass to pass during operation of the landscape machine over a large area of ground to be prepared thereby.

It is still another feature of this invention that the stone burying attachment can be selectively moved between an operative position and an inoperative position to permit selective operation thereof in conjunction with the operation of the landscape machine to which it is mounted.

It is yet another feature of this invention that the stone burying attachment does not require a source of rotational power delivered thereto to effect operation.

It is a further feature of this invention that the stone burying attachment incorporates a breakaway feature to prevent extensive damage to the attachment and/or the landscape machine in instances where the attachment engages an obstacle that cannot be moved.

It is yet another advantage of this invention that the stone burying attachment can be selectively activated to effect a below ground disposal of the stones and debris collected by the landscape machine whenever the operator decides that sufficient amounts of unwanted debris has been accumulated from previous passes of the landscape machine to warrant disposal thereof during operation of the machine.

It is a further advantage of this invention that a landscape machine equipped with a stone burying attachment can produce a smooth, level, rock-free seedbed surface suitable for seeding or sodding without requiring a remote disposition of stones and debris collected during operation of the machine.

It is still a further feature of this invention that the stone burying attachment can be selectively set at varying positions relative to the main frame of the landscape machine to provide selectively variable depths of the furrow formed thereby as desired by the operator.

It is still another object of this invention to provide a stone burying attachment for a finish grading landscape machine which is durable in construction, inexpensive of manufacture, carefree of maintenance, facile in assemblage, and simple and effective in use.

These and other objects, features and advantages are accomplished according to the instant invention by providing a stone burying attachment for a finish grading landscape machine where in the attachment is optionally mounted to the main frame of the landscape machine to create a furrow immediately forwardly of the discharge side of the machine for receipt therein of stones and other unwanted debris collected by the landscape machine during operation thereof which can then be covered by a subsequent pass of the landscape machine. The stone burying attachment is positionally adjustable between an inoperative position and a plurality of operative positions to permit a selective engagement thereof at the discretion of the operator. The attachment includes a disc positioned angularly with respect to the direction of travel and also positionable at a plurality of varying heights in the operative position for selectively varying the desired depth of the furrow being formed thereby. A breakaway feature protects the attachment if the disc operatively engages an immovable object.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
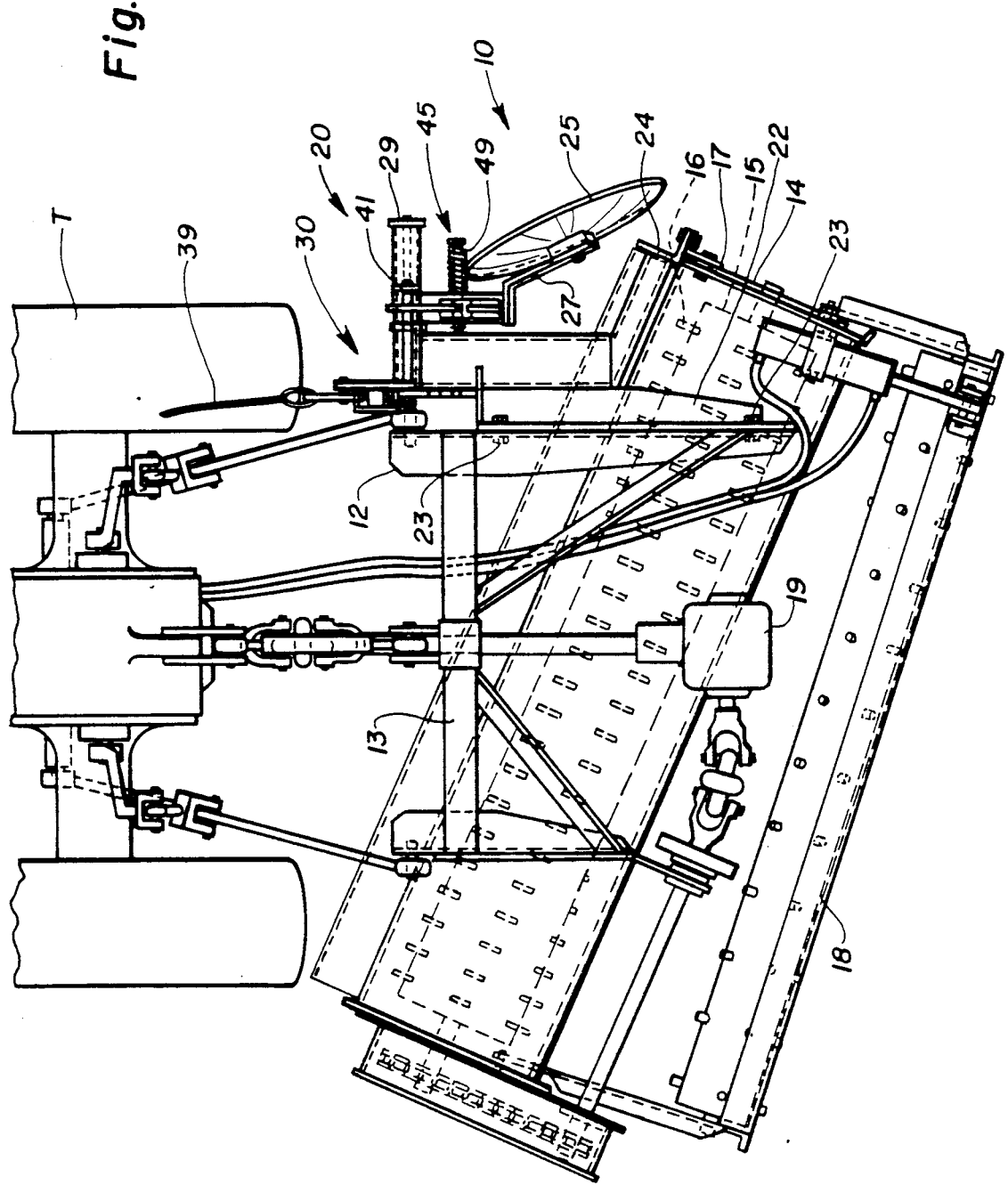
FIG. 1 is a top plan view of the landscape machine having a stone burying attachment incorporating the principles of the instant invention mounted thereon, the tractor to which the landscape machine is mounted and operatively connected being partially broken away.
Figure 2:
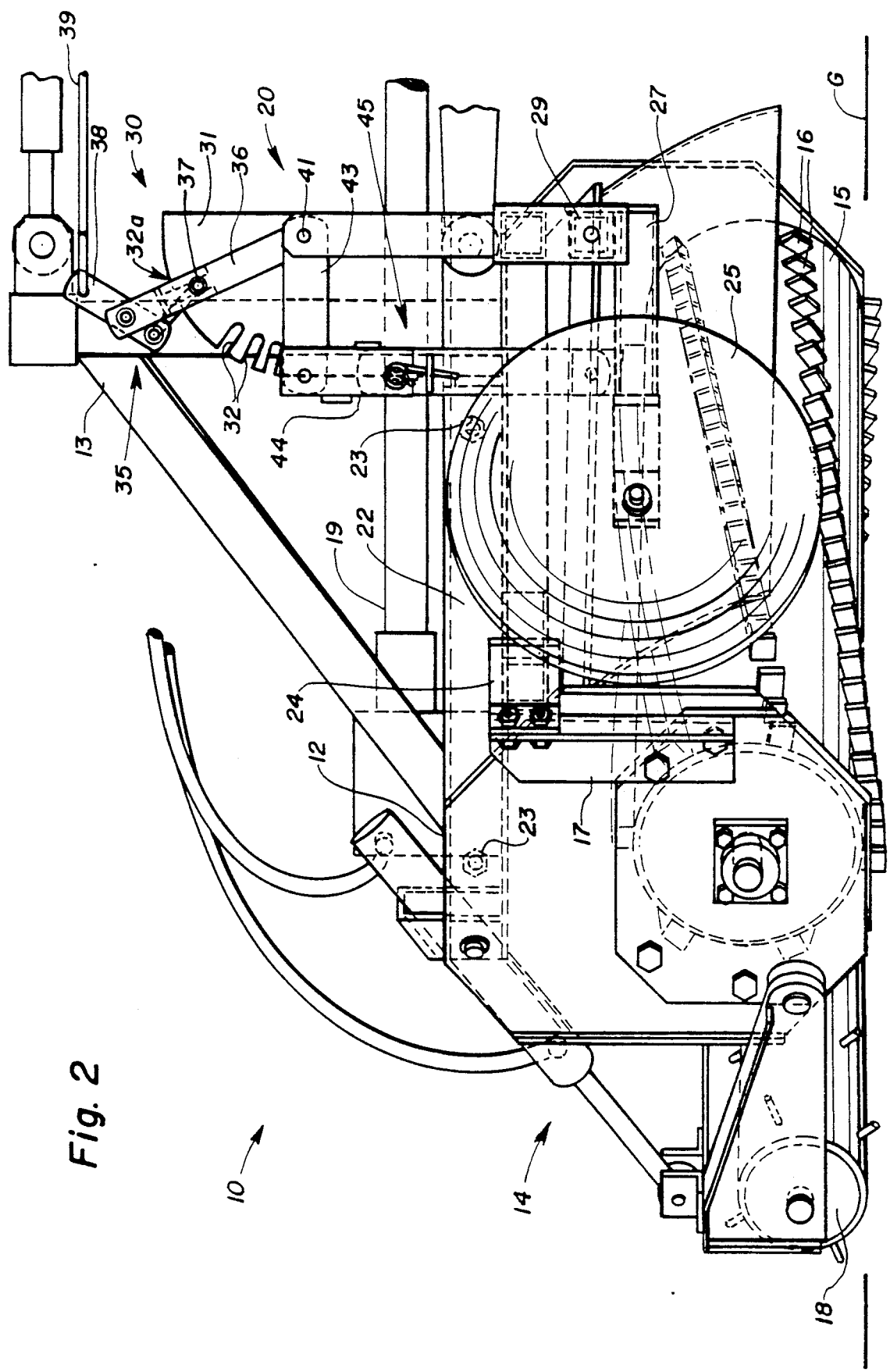
FIG. 2 is an enlarged right side elevational view of the landscape machine shown in FIG. 1 with the stone burying attachment being raised into the inoperative position.

Referring now to the drawings and, particularly, to FIGS. 1 and 2, the structure of the stone burying attachment mounted to the frame of a finish grading landscape machine, which in turn is operatively connected to the three-point hitch and power-takeoff shaft of a standard tractor T, can best be seen. Any left and right references are made as a matter of convenience and are determined by standing at the rear of the landscape machine, facing the tractor T and the direction of travel.

The landscape machine 10 is of known construction of the type embodied in the Model 600 and Model 800 Preseeder TM seedbed preparation machine commercially available from ATI Corporation. The landscape machine 10 includes a main frame 12 forming a three-point hitch mounting structure 13 adapted for connection to a standard three-point hitch of the tractor T to which the landscape machine 10 is operatively connected. The frame 12 rotatably carries a ground engaging rotor 15 mounted obliquely to the direction of travel, preferably at an angle of approximately 24 degrees from being perpendicular to the direction of travel. A rear roller 18 is rotated through engagement with the ground and is supported from the frame 12 rearwardly of the rotor 15 at an oblique angle to both the direction of travel and the rotor 15 to smooth the surface of the ground and effect a dimpled aeration thereof for receipt of seeding materials, effectively eliminating an uneven ground surface formation, commonly referred to as washboarding.

The rotor 15 is provided with blades 16 spirally affixed to the rotor 15 around the circumference thereof to engage the ground G and effect a tilling and leveling thereof in a known manner. A drive mechanism 19, operatively connected to the standard power-takeoff shaft of the tractor T to receive rotational power therefrom, is drivingly connected to the rotor 15 to effect rotation thereof in a counter-clockwise direction when viewed from the right side of the landscape machine 10, so that the blades 16 while engaging the ground G are moving toward the tractor T. This counter-rotating rotor 15 moves soil in front of itself to effect a leveling the surface of the ground.

The oblique angling of the rotor 15, with respect to the direction of travel of the landscape machine 10, causes a lateral movement of the material, including soil, stones and debris, toward the discharge side 14 of the machine 10. While the soil kicked forwardly by the counter-rotating rotor 15 levels out between the blades 16 or is carried over the rotor 15 for deposit on the ground G behind the rotor 15, the stones and other debris move laterally with the rotation of the rotor 15 until being discharged from the discharge side 14 of the main frame 12 into a windrow placed immediately adjacent the landscape machine 10.

Since this accumulation of windrowed stones and debris grows with each successive pass of the landscape machine 10 of the ground, it eventually becomes necessary to dispose of this unwanted material to maintain the efficient operation of the machine 10. As best seen in FIGS. 1 and 2, the landscape machine 10 is provided with a stone burying attachment 20 detachably connected to the frame 12 and selectively operable to form a ditch or furrow in the surface of the ground immediately forwardly of the discharge side 14 of the machine 10. The lateral movement of the stones and debris by the rotor 15 is then discharged into this created furrow so that they can be buried below the surface of the ground G on a subsequent pass of the machine 10, as will be described in greater detail below.

Referring now to FIGS. 1-4, the structural details of the stone burying attachment 20 can best be seen. The stone burying attachment 20 is provided with an apertured mounting frame 22 that is detachably connected by fasteners 23 to the frame 12 of the landscape machine 10. For purposes of stability, the mounting frame 22 also includes an outrigger member 24 which detachably connects to the casing 17 rotatably supporting the rotor 15. One skilled in the art will readily realize that the particular shape of the mounting frame 22 may vary according to the specific configuration of the main frame 12 of the landscape machine 10, so long as the stone burying attachment 20 can be rigidly mounted to the landscape machine 10, yet be detachable therefrom to permit service and replacement of the stone burying attachment 20, as well as use thereof as an optional attachment for the landscape machine 10.

The stone burying attachment 20 includes a furrow making element 25, such as a cupped disc engageable with the ground G to create a furrow as the landscape machine 10 moves forwardly over the surface of the ground. The furrow making element 25 may be in the form of a shovel-like blade or other equivalent device, but is preferably a disc 25 rotatably connected to a mounting arm 27 which is pivotally suspended from a pivot assembly 29 supported from the mounting frame 22. An actuating mechanism 30 is mounted on the mounting frame 22 and linked to the mounting arm 27. This actuating mechanism 30 is depicted as being cable activated, although other alternative embodiments would also be operably effective, and serves to control the pivotal movement of the disc 25 and mounting arm 27 about the pivot assembly 29 and position the disc 25 between a lowered ground engaging position (shown in solid lines in FIG. 3) and a raised inoperative position (shown in phantom lines in FIG. 3).

The actuating mechanism 30 includes a notched quadrant 31 with notches 32a, 32 formed therein to correspond to the raised inoperative position and a series of ground engaging positions, respectively, in order of increasing depth penetration of the disc 25 into the ground G. A locking mechanism 35 includes a pivoted lever 36 carrying a linearly moveable locking pin 37, spring-loaded toward engagement with the notched quadrant, and a pivotally moveable actuating member 38, which in turn is pivotally connected to the locking pin 37. A rope or cable 39 is fastened to the actuating member 38 for remote operation thereof, such as from the operator's seat on the tractor T. The lever 36 is fixed to a sleeve 42 forming a part of a second pivot assembly 41 supported from the mounting frame 22 and permitting pivotal movement of the lever 36. A first link member 43 is also fixed to the sleeve 42 so as to be moveable in unison with the lever 36. A second link member 44 pivotally interconnects the first link member 43 and the mounting arm 27 to transfer pivotal movement of the actuating mechanism 30 to the mounting arm 27 for raising and lowering the disc 25, as described in greater detail below.

In instances where the disc 25 is engaged with the ground G and impacts into an immovable object, such as a large rock, the second link member 44 incorporates a breakaway device 45 to permit the disc 25 to raise upwardly out of the ground into the inoperative position, even though the actuating mechanism 30 is otherwise positioned to place the disc 25 in one of the ground engaging positions. The breakaway device 45 includes a bifurcated upper link portion 46 pivotally connected to and carrying a lower link portion 47. A stop 48 affixed to the upper link portion 46 restricts rotational movement of the lower link portion 47 in one direction beyond a position in which the upper and lower link portions 46, 47 are coaxially aligned.

A spring 49 interconnecting the upper and lower link portions 46, 47 biases the rotational movement of the lower link portion 47 relative to the upper link portion 46 against the stop 48. In the event the disc 25 encounters a resistance force greater than the biasing force exerted by the spring 49, the lower link portion 47 will rotate relative to the upper link portion 46 against the spring 49, allowing the disc 25 and mounting arm 27 to raise until the resistance force is abated whereupon the spring 49 returns the second link member 44 into its coaxial configuration and replaces the disc 25 into the preselected operative position. The amount of resistance force causing actuation of the breakaway device 45 can be varied by changing the biasing force exerted by the spring 49 in a conventional manner by changing the effective length thereof.

In operation, the stone burying attachment 20 is mounted to the landscape machine 10 by aligning the apertured mounting frame 22 and outrigger 24 with corresponding openings in the main frame 12 and rotor casing 17 of the landscape machine 10 and interconnecting with fasteners 23 so that the stone burying attachment 20 is rigidly affixed to the landscape machine 10. With the landscape machine 10 raised above the ground by the three-point hitch of the tractor T, the operator pulls on the rope or cable 39 to pivot the actuation member 38 on the lever 36 to effect a withdrawal of the locking pin 37 from the notch 32a corresponding to the disc 25 being in the raised inoperative position, as shown in phantom in FIG. 3. The weight of the disc 25, mounting arm 27, and actuation mechanism 30 cause a lowering of the pivoted lever 36 about the second pivot assembly 41 until the locking pin is aligned with a selected one of the other notches 32 corresponding to the depth of penetration of the disc 25 into the ground G desired by the operator. A releasing of the cable 39 allows the spring-loaded locking pin 37 to enter the selected notch 32 and place the disc 25 in the desired ground engaging position.

Figure 3:
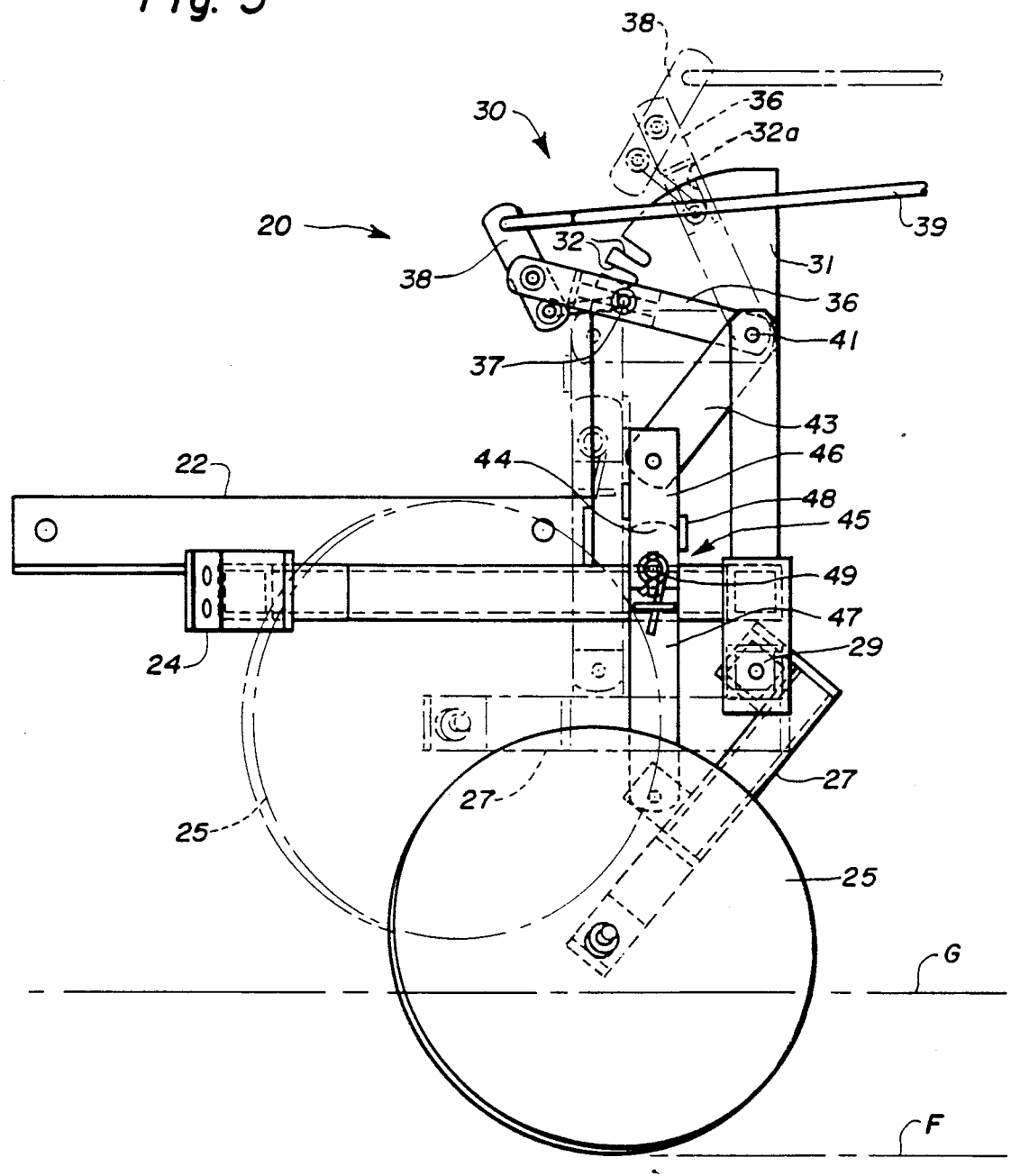
FIG. 3 is a side elevational view of the stone burying attachment as shown in FIG. 2, but in an operative position, the landscape machine being broken away for purposes of clarity, the inoperative position of the stone burying attachment being shown in phantom.
Figure 4:
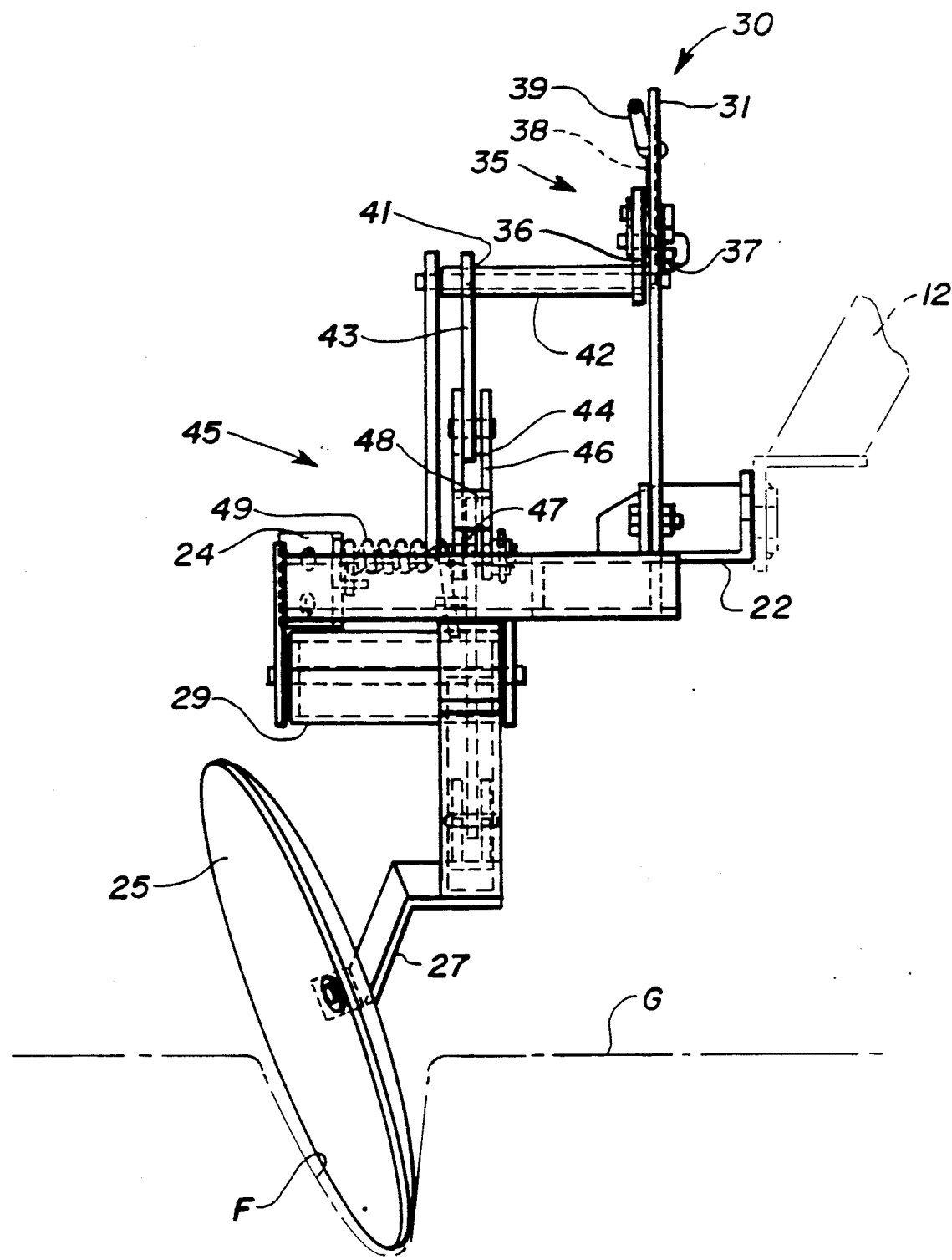
FIG. 4 is a front elevational view of the stone burying attachment shown in FIG. 3 with the furrow in the surface of the ground being formed thereby being schematically depicted, a portion of the frame of the landscape machine to which the attachment is mounted being shown in phantom with the remainder of the landscape machine being broken away for purposes of clarity.

A subsequent lowering of the landscape machine 10 to its normal operative position forces the disc 25 into the ground G, as depicted in solid lines in FIG. 3. Referring also to FIG. 4, it can be seen that a normal operation of the landscape machine 10 with the rotor 15 and blades 16 engaging the ground, results in the creation of a furrow F extending below the normal surface of the ground G with the soil therefrom being displaced outwardly away from the discharge side 14 of the machine 10. As best seen schematically in FIG. 5, the normal operation and forward motion of the landscape machine 10 along the direction of travel results in a discharge of the stones and debris from the discharge side 14 of the landscape machine 10 into the furrow F, the embankment of soil on the opposing side of the furrow F helping direct the stones into the furrow F.

Figure 5:
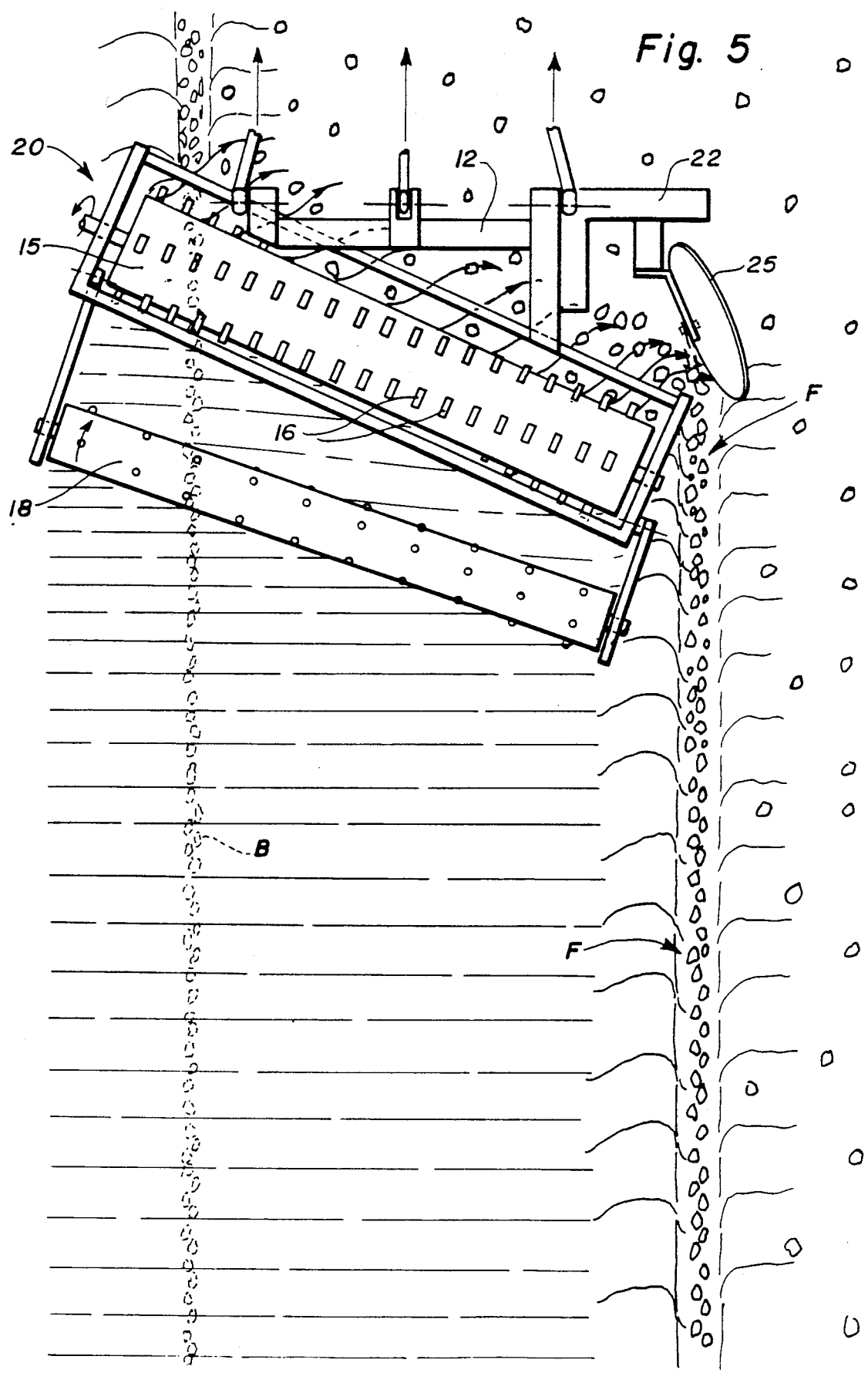
FIG. 5 is schematic top plan view of the landscape machine with the stone burying attachment mounted thereto in an operative position to depict the operation thereof.

If the depth of the furrow F is properly selected to correspond to the amount of stones and debris being windrowed off the discharge side 14 by the rotor 15, the furrow F will be substantially filled by the discharged material such that the next pass of the landscape machine 10 over the ground will result in a complete covering of the buried material with the surface of the ground thereabove being coextensive with the adjacent ground surface, as depicted in FIG. 5 by the buried windrow of stones B. Because of the embankment of soil created by the above-described operation of the stone burying attachment 20, the furrow F may be best covered over by making the next pass of the machine 10 in the opposite direction with the stone burying attachment 20 being raised into the inoperative position. Under some circumstances, however, operating the next pass of the machine 10 in the same direction will still result in a smooth uniform finished ground surface.

To raise the stone burying attachment 20 into the inoperative position, the operator must simply pull on the rope or cable 39 to withdraw the locking pin 37 from the notch 32 corresponding to the selected operating, ground engaging position. A further pulling on the rope or cable 39 will effect a lifting of the disc 25 and mounting arm 27 until the locking pin 37 is positioned above the notch 32a whereupon a relaxing of the pulling force on the cable 39 will permit the locking pin 37 to enter the notch 32a and fix the disc 25 into the raised inoperative position. One skilled in the art will readily realize that a movement of the disc 25 from one operating depth to another is accomplished in the identical manner described above, except that the actuating mechanism is moved only sufficiently enough to reposition the locking pin 37 over the notch 32 corresponding to the desired depth of operation.

In circumstances where the amount of stones and debris in the ground is minimal, the operator may want to continue normal operation of the landscape machine 10 accumulating the 10 unwanted material in a windrow off the discharge side 14, with the stone burying attachment 20 in the raised inoperative position, in pass after pass until sufficient amounts of such material has been accumulated to warrant the burial thereof. Prior to making the next pass across the ground with the landscape machine 10, the operator may then lower the stone burying attachment 20 to the desired operating depth to form the furrow F for receipt of the discharged windrow below the surface of the ground on the next pass. The subsequent pass of the landscape machine 10, as shown in FIG. 5, will result in a covering of the deposited stones and debris. The stone burying attachment 20 can be raised back into the inoperative position prior to this subsequent pass until sufficient amounts of unwanted material have again been accumulated.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A machine for preparing the surface of the ground for planting comprising:
   a main frame adapted for connection to a prime mover;
   a rotor assembly supported by said main frame and being operable to engage the surface of the ground and to convey debris engaged by said rotor on the surface of the ground to a discharge side of said main frame; and
   a stone burying attachment supported from said main frame to create a furrow in said ground forwardly of said discharge side of said main frame as said machine is operatively moved over the surface of the ground to receive said debris conveyed by said rotor to said discharge side for placement of said debris below the surface of the ground.

2. The machine of claim 1 wherein said stone burying attachment is movably positionable between an operative ground engaging position in which said stone burying attachment is operable to create said furrow and a raised inoperative position in which said stone burying attachment does not engage the ground.

3. The machine of claim 2 wherein said stone burying attachment includes a furrow making element pivotally movable between said operative and inoperative positions.

4. The machine of claim 3 wherein said furrow making element is a disc rotatably affixed to a mounting arm, said mounting arm being pivotally mounted for movement in a generally vertical plane.

5. The machine of claim 4 wherein said stone burying attachment includes an actuating mechanism operatively associated with said disc to effect the pivotal movement thereof from a remote position.

6. The machine of claim 5 wherein said actuating mechanism includes a locking mechanism for selectively fixing said disc in a selected one of said operative and inoperative positions.

7. The machine of claim 6 wherein said actuating mechanism is operable to position said disc in a plurality of operative positions corresponding to differing depths of the furrow to be made by said disc.

8. The machine of claim 7 wherein said actuating mechanism further includes a breakaway device operable to permit said disc to move from said operative position to said inoperative position without manipulation of said actuating mechanism upon impact of said disc with an object resisting the formation of said furrow with a force greater than a preselected amount.

9. The machine of claim 8 wherein said breakaway device is incorporated into a linkage interconnecting said actuating mechanism and said mounting arm.

10. The machine of claim 8 wherein said stone burying attachment also includes a mounting frame detachably affixed to said main frame to permit the removal of said stone burying attachment from said machine.

11. The machine of claim 8 wherein said machine further comprises a rear roller supported from said main frame rearwardly of said rotor and mounted obliquely thereto.

12. In a machine movable over the ground along a direction of travel for preparing the surface of the ground for planting, said machine having a main frame adapted for connection to a prime mover; a rotor assembly supported by said main frame in an oblique orientation relative to the direction of travel, said rotor having a plurality of ground engaging elements affixed around the circumference thereof to engage the surface of the ground and to convey debris engaged by said ground engaging elements along the surface of the ground to a discharge side of said main frame; and drive means operable to receive rotational power and effect a rotation of said rotor about an axis extending obliquely to said direction of travel, the improvement comprising:
   a stone burying attachment mounted on said main frame forwardly of said discharge side thereof for selective engagement of the ground to form a furrow therein for deposit of said debris conveyed by said rotor to said discharge side of said frame.

13. The machine of claim 12 wherein said stone burying attachment includes a furrow making element movable between a raised inoperative position in which said furrow making element is not engaged with the ground and a lowered operative position in which said furrow making element is engaged with the ground and operable to create a furrow upon movement of said machine along said direction of travel.

14. The machine of claim 13 wherein said stone burying attachment further includes a mounting frame, said furrow making element being a disc rotatably connected to a mounting arm, said mounting arm being pivotally supported from said mounting frame for generally vertical movement thereof between said operative and inoperative positions.

15. The machine of claim 14 wherein said stone burying attachment further includes an actuating mechanism for controlling the positioning of said disc, said actuating mechanism having a locking mechanism for fixing said disc in a selected one of said operative and inoperative positions, said locking mechanism being further operable to position said disc in any of a plurality of operative positions corresponding to varying depths of the furrow to be created by said disc.

16. The machine of claim 15 wherein said mounting frame is detachably connected to said main frame by removable fasteners, said mounting frame further including an outrigger detachably connectable to a casing surrounding a portion of said rotor to stabilize the mounting of said stone burying attachment to said machine.

17. A stone burying attachment detachably connectable to a machine movable over the ground along a direction of travel for preparing the surface of the ground for planting, said machine having a main frame connectable to a prime mover; a rotor assembly rotatably supported by said main frame for rotation about an axis extending obliquely to the direction of travel, said rotor having a plurality of blades affixed around the circumference thereof to engage the surface of the ground and to convey debris engaged by said blades along the surface of the ground to a discharge side of said main frame; and drive means operable to receive rotational power from said prime mover and effect a rotation of said rotor, comprising:

a mounting frame detachably connecting said stone burying attachment to said main frame;

a furrow making element pivotally supported from said mounting frame for generally vertical movement between a raised inoperative position and a lowered operative position in which said furrow making element is engageable with the ground to make a furrow therein, said furrow making element being positioned forwardly of said discharge side of said main frame to form said furrow for receipt of said debris conveyed to said discharge side by said rotor; and actuating mechanism operably coupled to said furrow making element to control the pivotal movement thereof between said operative and inoperative positions, said actuating mechanism including locking means operable to fix said furrow making element in a selected one of said operative and inoperative positions.

18. The stone burying attachment of claim 17 wherein said locking means is operable to place said furrow making element in a plurality of operative positions corresponding, respectfully, to different depths of the furrow to be created thereby.

19. The stone burying attachment of claim 18 wherein said furrow making element comprises a disc rotatably connected to a mounting arm, said mounting arm being pivotally supported from said mounting frame, said actuating mechanism further including a linkage interconnecting an actuating lever pivotally supported on said mounting frame and said mounting arm, the pivotal movement of said actuating lever being controlled by said locking means.

20. The stone burying attachment of claim 19 wherein said linkage interconnecting said actuating lever and said mounting arm incorporates a spring-loaded breakaway device operable to permit said disc to move from the selected one of said operative positions to said inoperative position without manipulation of said actuating mechanism upon engagement of the disk, during creation of said furrow with an object resisting formation of said furrow with a force greater than a preselected spring force.

* * * * *